(12) United States Patent
Gilleran et al.

(10) Patent No.: US 8,833,694 B2
(45) Date of Patent: Sep. 16, 2014

(54) SPLIT CIRCUMFERENCE AIRCRAFT WHEEL ASSEMBLY WITH INTEGRATED DRIVE MOTOR ASSEMBLY

(76) Inventors: Neal Gilleran, Long Beach, CA (US); Robert Sweet, Beaver, UT (US); Scott Perkins, Kent, WA (US)

( * ) Notice: Subject to any disclaimer, the term of this patent is extended or adjusted under 35 U.S.C. 154(b) by 3 days.

(21) Appl. No.: 13/523,865

(22) Filed: Jun. 14, 2012

(65) Prior Publication Data

US 2013/0056580 A1 Mar. 7, 2013

Related U.S. Application Data

(60) Provisional application No. 61/496,766, filed on Jun. 14, 2011.

(51) Int. Cl.
*B64C 25/50* (2006.01)

(52) U.S. Cl.
USPC ........ 244/50; 244/103 R; 188/65.1; 310/67 R

(58) Field of Classification Search
USPC .................. 244/50, 103 R, 103 S, 111, 51, 58
See application file for complete search history.

(56) References Cited

U.S. PATENT DOCUMENTS

| 2,408,163 | A | * | 9/1946 | Fodor .......................... 244/103 S |
| 3,327,754 | A | * | 6/1967 | Travers ........................... 152/410 |
| 4,635,695 | A | * | 1/1987 | Frank et al. ..................... 152/410 |
| 4,683,930 | A | * | 8/1987 | Elam et al. ..................... 152/410 |
| 5,086,821 | A | * | 2/1992 | Russell et al. ................. 152/410 |
| 5,215,137 | A | * | 6/1993 | Weeks et al. ................ 152/379.4 |
| 5,409,048 | A | * | 4/1995 | Kipp et al. .................. 152/381.4 |
| 6,550,510 | B2 | * | 4/2003 | Champion ..................... 152/410 |
| 6,786,259 | B2 | * | 9/2004 | Vehar et al. .................... 152/410 |
| 7,226,018 | B2 | * | 6/2007 | Sullivan ......................... 244/111 |
| 7,445,178 | B2 | * | 11/2008 | McCoskey et al. ............. 244/50 |
| 2002/0129884 | A1 | * | 9/2002 | Champion ..................... 152/410 |
| 2003/0168143 | A1 | * | 9/2003 | Vehar et al. .................... 152/410 |
| 2005/0242937 | A1 | * | 11/2005 | Yokoi et al. ................... 340/447 |
| 2006/0273686 | A1 | * | 12/2006 | Edelson et al. ............... 310/266 |
| 2007/0282491 | A1 | * | 12/2007 | Cox et al. ......................... 701/3 |
| 2008/0251639 | A1 | * | 10/2008 | Kipp et al. ................ 244/103 R |
| 2009/0152055 | A1 | * | 6/2009 | Cox .............................. 188/71.6 |
| 2009/0261197 | A1 | * | 10/2009 | Cox et al. ........................ 244/50 |
| 2010/0288873 | A1 | * | 11/2010 | Cox et al. ........................ 244/50 |
| 2011/0057503 | A1 | * | 3/2011 | Marsaly et al. ............ 301/95.11 |
| 2012/0248855 | A1 | * | 10/2012 | Shamo ..................... 301/64.307 |
| 2012/0313423 | A1 | * | 12/2012 | Brown et al. ................. 301/35.3 |

\* cited by examiner

*Primary Examiner* — Christopher P Ellis
*Assistant Examiner* — Medhat Badawi

(57) ABSTRACT

A split circumference wheel assembly is provided for an aircraft landing gear wheel configured to maximize the space available within a landing gear wheel well to support a motor driver assembly with drive means that drives the aircraft wheel on the ground. The split circumference wheel assembly includes separable inboard and outboard support walls that are spaced axially apart a maximized distance so that the motor driver assembly is completely contained within the maximized space defined. A preferred wheel assembly employs a demountable flange and a locking ring to integrally and removably support the motor driver assembly within the maximized wheel volume to drive one or more aircraft wheels and move the aircraft independently on the ground. The wheel and motor driver assembly described herein are designed to be retrofitted in an existing aircraft wheel.

15 Claims, 2 Drawing Sheets

SPLIT CIRCUMFERENCE AIRCRAFT WHEEL ASSEMBLY WITH INTEGRATED DRIVE MOTOR ASSEMBLY

PRIORITY CLAIM

This application claims priority from U.S. Provisional Patent Application No. 61/496,766, filed Jun. 14, 2011, the disclosure of which is fully incorporated herein.

TECHNICAL FIELD

The present invention relates generally to aircraft wheel structures with circumferentially divided rims and, specifically, to a demountable flange aircraft wheel assembly with a drive motor assembly completely integrated within the dimensions of the aircraft wheel assembly to drive the aircraft wheel on the ground.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become an airline priority. The safe and efficient ground movement of a large number of aircraft simultaneously into and out of the ramp and gate areas has become increasingly important. As airline fuel costs and safety concerns and regulations have increased, the use of the aircraft main engines is no longer the best option for achieving the desired safe and efficient ground movement.

Various alternatives to the use of an aircraft's main engines to move an aircraft on the ground are available and have been tried. The use of a tug or tow vehicle to move an aircraft into and out of a gate or parking location can eliminate the need to use the aircraft main engines. This option, however, is not without its own challenges and costs. More ground vehicles, requiring more fuel and more ground personnel to operate them, add to an already congested environment in the gate area. Restricted use of the aircraft engines on low power during arrival at or departure from a gate is an additional option. This option is also problematic, however. Not only does engine use consume fuel, it is also noisy, and the associated safety hazards of jet blast and engine ingestion in a congested area are significant concerns that cannot be overlooked.

The use of a motor structure mounted in connection with a wheel to rotate the wheel and drive a vehicle, including an aircraft, has been proposed. The use of such a structure, ideally, should move an aircraft without the use of an aircraft's main engines. U.S. Pat. No. 2,430,163 to Dever, U.S. Pat. No. 3,977,631 to Jenny, U.S. Pat. No. 7,226,018 to Sullivan, and U.S. Pat. No. 7,445,178, McCoskey et al, for example, all describe drive motors associated with aircraft gear wheels intended to drive an aircraft on the ground. None of the foregoing patents, however, suggests a boltless wheel structure with an integral drive motor assembly. Nor does this art describe a boltless wheel assembly that is configured to maximize the limited landing gear space available to support substantially within the wheel a compact motor assembly capable of powering an aircraft drive wheel that could be easily installed on an existing aircraft.

Many aircraft wheels are made, like the wheel described in U.S. Pat. No. 5,409,048 to Kipp et al, with two sections that are fastened together with appropriate bolts and nuts or other like fasteners. Removal of the wheel for repair or maintenance requires having the proper tools available to remove the bolt or other fastener. Access to the bolts or fasteners may not be easy or may require the removal of other wheel assembly components. One type of aircraft wheel in current use has a circumferentially divided rim, typically with a tire bead flange on the inboard side of the wheel that is formed integrally with the wheel rim. A removable, or demountable, tire bead flange located on the outboard side of the wheel is removed to permit tire changes. A split lock ring seated in the wheel rim maintains separable wheel structures in place during operation of the aircraft. These annular retaining structures may be designed to be kept in place with retaining elements other than bolts or similar fasteners, but may also be secured by bolts. Some type of closure mechanism that can be opened without requiring tools may be fitted on the wheel to apply sufficient pressure on the wheel to keep the wheel sections together. Split compression ring or snap ring wheels were widely used on World War II era aircraft. Their use was essentially discontinued, however, as a result of problems with distortion, cracking, wear, and the like. Tire changes could also be challenging with this type of wheel.

Lock ring assemblies for circumferentially divided and demountable flange aircraft wheels have been proposed more recently, in U.S. Pat. No. 5,086,821 to Russell et al and U.S. Pat. No. 6,786,259 to Vehar et al, for example. Russell et al describe an annular locking ring for an aircraft wheel that distributes stress loading and overall bulk and weight. This arrangement is intended to reduce force distribution and eliminate cracking and excessive wear. Vehar et al describe an improved variation of an aircraft wheel locking ring designed to prevent the locking ring from being thrown from the aircraft wheel in the event of a flat tire or a blowout. A specifically configured retaining key and spring type clip hold the locking rim together in a manner that provides suitable gaps to enable the expansion and contraction of the locking ring.

International Publication No. WO 95/09737 to Allied Signal, Inc. discloses an aircraft wheel demountable flange with a retaining ring sealed by a flexible composite seal. U.S. Pat. No. 6,550,510 to Champion also discloses a demountable flange on an aircraft wheel with a retaining ring configured to have a cross-sectional geometry that is stated to reduce the likelihood of fatigue damage to the wheel rim. None of the foregoing patents or publication, however, suggests that the demountable flange or locking rim wheels disclosed therein could be used effectively on an aircraft wheel assembly that is specifically configured to integrally support within the dimensions of the wheel a drive motor assembly capable of driving the wheel to move the aircraft on the ground.

Published United States patent applications, including U.S. Patent Application Publication Nos. US2006/0273686 to Edelson, US2007/0282491 to Cox et al, US2009/0152055 to Cox, US2009/0261197 to Cox, International Patent Application Publication No. WO 2008/027458 to Cox et al, and British Patent No. 2457144, owned in common with the present invention, describe aircraft drive systems that use electric drive motors to power aircraft wheels and move an aircraft on the ground. These disclosures focus on specific aspects of the drive systems and motor assemblies, including, inter alia, drive system data, motor design, tire profile, and motor cooling, rather than on features of aircraft wheel structures.

A need exists, therefore, for a split circumference, demountable flange, or locking rim aircraft wheel assembly designed to support an integral drive motor assembly completely within the volume defined by the inboard and outboard axial dimensions of an aircraft wheel well that functions efficiently to drive the aircraft wheel and, therefore, the aircraft on the ground. A need also exists for a split circumference aircraft wheel with an integrally supported drive motor that can be easily installed in an existing aircraft landing gear.

SUMMARY OF THE INVENTION

It is a primary object of the present invention, therefore, to provide a split circumference, demountable flange, or locking rim aircraft wheel assembly designed to support an integral drive motor assembly completely within the volume defined by the inboard and outboard axial dimensions of an aircraft wheel well that functions efficiently to drive the aircraft wheel and, therefore, the aircraft on the ground.

It is another object of the present invention to provide a split circumference aircraft wheel with an integrally supported drive motor that can be easily installed in an existing aircraft landing gear.

It is an additional object of the present invention to provide a locking rim aircraft wheel assembly with a wheel structure that is secured by wheel fastening structure other than bolts or the like to enclose a drive motor assembly within the space defined by the inboard and outboard extents of an aircraft wheel well.

It is a further object of the present invention to provide a split circumference aircraft wheel assembly with an integral drive motor assembly that employs an annular ring with a locking structure to secure the wheel assembly components that support the drive motor assembly components completely within an aircraft wheel well.

It is yet another object of the present invention to provide a demountable wheel assembly configured to integrally support an electric drive means within an aircraft gear wheel assembly that maximizes the space available within the landing gear for installation of the motor.

It is yet an additional object of the present invention to provide a split circumference wheel assembly configured to support an electric drive means integrated with an aircraft gear wheel that can be installed on an existing aircraft.

It is yet a further object of the present invention to provide a locking ring aircraft wheel assembly configured to support a drive motor that is easily removed without tools to provide easy access to wheel and motor components for maintenance or repair after installation of the aircraft wheel assembly.

In accordance with the aforesaid objects, a split circumference wheel assembly configured to integrally support a drive motor assembly completely within the dimensions of an aircraft landing gear wheel well is provided. The split circumference wheel configuration includes demountable flange and locking ring structures designed to mount a tire on the wheel and to securely hold the wheel assembly components together while maximizing the space available in an existing aircraft landing gear wheel well to support the drive motor assembly, which preferably includes an electric drive means, within this space. This split circumference wheel and motor driver assembly effectively powers the wheel within which it is installed to drive the aircraft on the ground independently of and without reliance on the aircraft main engines. Maintenance, such as tire changes, and service of the wheel and motor is much simplified by the use of a locking ring or other fastener with the integral design of the wheel assembly and motor driver assembly of the present invention.

Other objects and advantages will be apparent from the following description, drawings, and claims.

DETAILED DESCRIPTION OF THE INVENTION

The many advantages of being able to drive an aircraft on the ground independently without using the aircraft main engines, as discussed above, have been acknowledged. The advantages of being able to remove a wheel quickly without requiring special tools for maintenance, repair, or replacement have also been acknowledged. Integrating a motor within an aircraft gear wheel as the aircraft is being constructed does not present problems because the space available for landing gear components, including motors for driving gear wheels, can be adjusted as required. Retrofitting existing aircraft can present significant challenges, however. Because of its unique configuration, the integral split circumference wheel assembly and motor driver assembly of the present invention overcomes these challenges and provides a wheel assembly and integral motor driver assembly that can be fitted into the limited space available for aircraft landing gear components. The wheel assembly and integral motor driver assembly of the present invention is designed to make it possible to retrofit existing aircraft simply and effectively so that these older aircraft can achieve the fuel and cost savings and other advantages of aircraft ground movement that does not rely on and is independent of the aircraft's engines and external ground vehicles.

Figure 1:
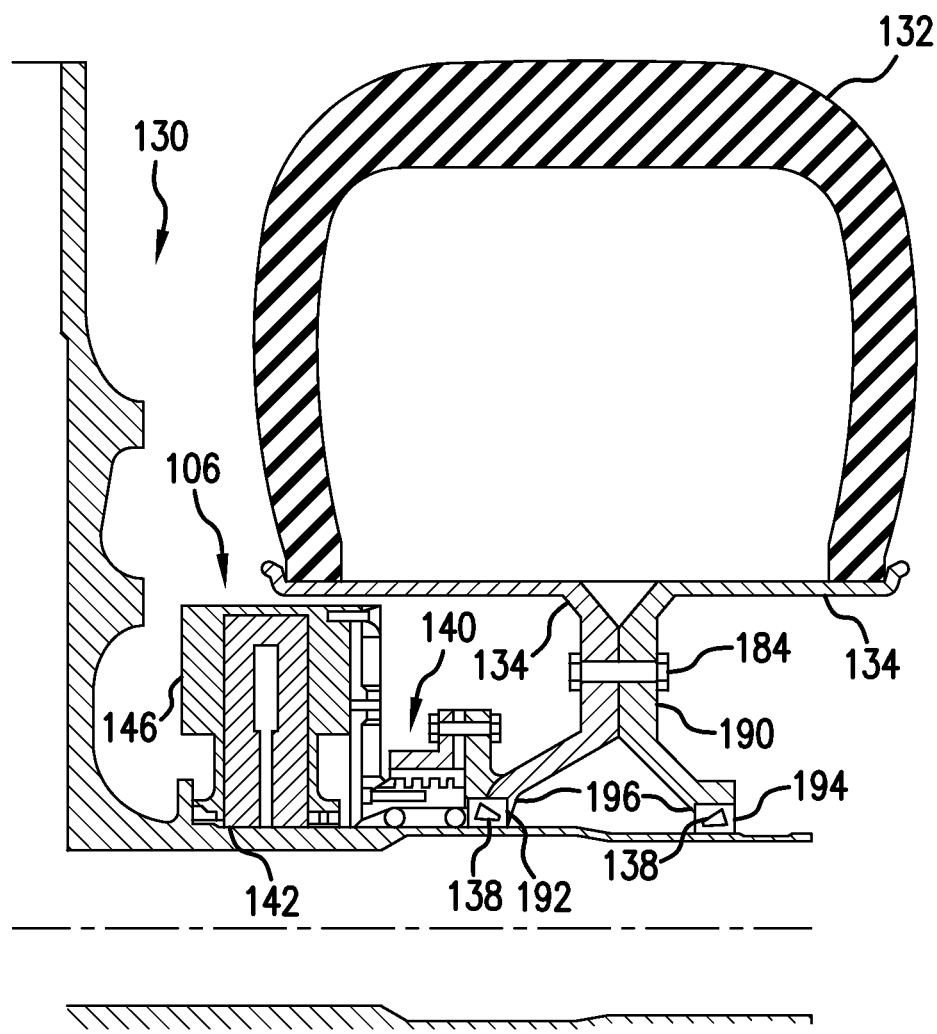
FIG. 1 illustrates a prior art wheel and motor assembly for an aircraft landing gear that uses bolts to fasten the wheel components together.

None of the advantages presented by the split circumference wheel assembly and motor driver assembly of the present invention are demonstrated by prior art aircraft landing gear wheel and motor designs. FIG. 1 shows one such prior art design, which is described and shown in U.S. Pat. No. 7,445,178. A landing gear system 130 includes a tire 132 attached to a wheel 134. A wheel motor 106 with a rotor 146 and a stator 142 drives the wheel. A bolt 184 couples a first wheel rim half 190 to its corresponding second wheel rim half (not numbered). The configuration of the wheel and motor assembly shown in FIG. 1 differs in significant respects from that of the present invention. This wheel structure has a very different tire bead flange arrangement, uses bolts to hold the wheel sections together, and incorporates the wheel support structures primarily within the space between the wheel and the axle. This arrangement does not maximize the space available to integrate the motor or drive mechanism completely within the space defined by the wheel or wheel well. Consequently, the arrangement shown in FIG. 1 will not realize the significant ease of maintenance and other advantages of the split circumference wheel assembly and integral motor driver assembly arrangement of the present invention.

Figure 2:
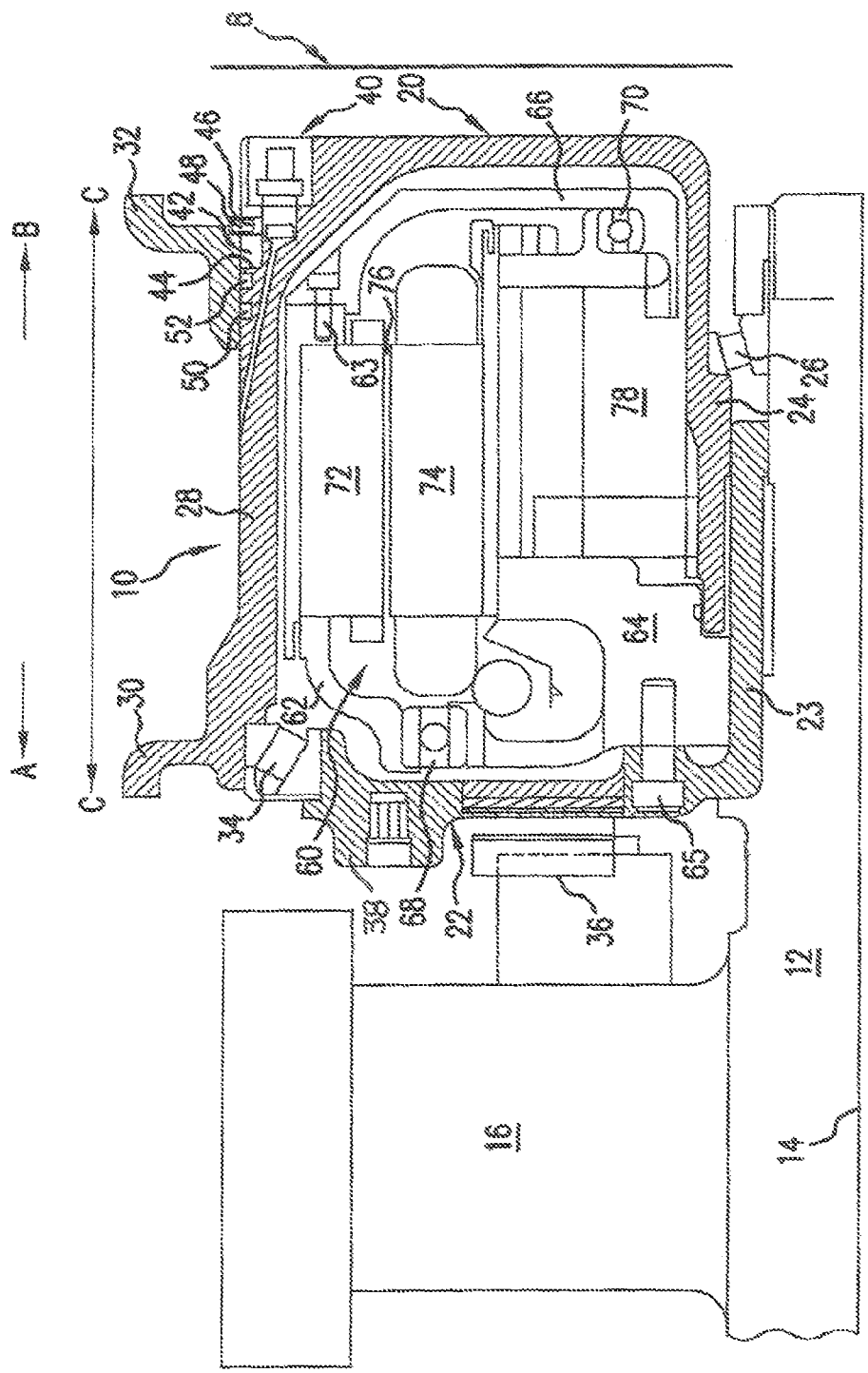
FIG. 2 is a diagrammatic illustration of a preferred split circumference wheel and motor driver assembly configuration in accordance with the present invention.

FIG. 2 illustrates diagrammatically a split circumference wheel assembly and integral motor driver assembly according to the present invention. The overall configuration of the present wheel and motor driver assembly will be compared to the prior art wheel and motor arrangement discussed in connection with FIG. 1 above. In FIG. 2, the arrows A and B indicate, respectively, the inboard and outboard orientation of the wheel and motor driver assembly with respect to an aircraft landing gear. The wheel assembly 10 is shown as it appears mounted on an aircraft wheel axle 12, with the longitudinal midline of the axle 12 represented at 14. A landing gear piston 16 is located inboard of the wheel assembly 10, and a wheel well opening, represented by the vertical line 18, defines the outboard dimension of the wheel well. The wheel assembly 10 is mounted on the axle 12 to substantially completely fill the space between the piston 16 and the wheel well opening 18.

FIG. 2 clearly shows that the wheel assembly 10 of the present split circumference wheel and motor driver assembly has a configuration that is different from a common standard wheel shape and from the shape shown in FIG. 1. The common standard wheel shape typically bends inwardly toward the inboard direction from the wheel outer rim. The wheel configuration of the present invention bulges instead in the opposite direction, toward the outboard direction. This configuration maximizes the internal wheel volume and provides maximum space for a compact motor driver assembly to fit completely within an aircraft wheel well space.

The wheel assembly 10 is formed from two separable sections or support walls. An outboard section or support wall 20 is connected to an inboard section or support wall 22 at the axle 12 with an axle bolt (not shown) of the type commonly used for this purpose. The inboard wheel section 22 includes an axle-contacting extension 23 that directly contacts the axle 12 and supports a corresponding extension 24 of the outboard wheel section 20 so that the extensions 23 and 24 overlap along the axle, where these extensions are secured to the axle by an axle bolt (not shown) or other suitable fastener. The outboard wheel section 20 is additionally supported on the axle 12 by a bearing structure 26 that contacts both the axle and the extension 24 of the outboard wheel section 20. The outboard wheel section 20 further includes a transverse section 28 spaced outwardly of the axle 12 from extension 24 to support an inflatable tire (not shown in FIG. 2) on respective inboard and outboard tire bead flanges 30 and 32. Inboard flange 30 is formed integrally with the wheel transverse section 28. Outboard flange 32 is a separable or demountable type of tire bead flange, as will be discussed below. A bearing structure 34 on the inboard side of the wheel provides a connection between inboard wheel section 22 and outboard wheel section 20. The bearing structures 26 and 34 are preferably configured to be larger and capable of handling a larger shock load than currently used aircraft wheel bearings, which extends travel life and permits more evenly distributed loads.

The shape and location of the inboard wheel section 22 are selected so that this structure is located as close as possible to the landing gear piston 16. A connector 36 for receiving wiring connectors or a wiring harness (not shown) to connect the motor driver assembly to a source of aircraft electric power is provided in the inboard wheel section 22. The inboard wheel section 22 is also preferably configured to include an integral strut torque arm, such as structure 38, which is preferably connected to a non-rotating structure, to provide for a torque reaction.

The outboard wheel section 20 is preferably configured to include a tire valve access assembly 40 oriented toward the wheel opening represented by line 18. The maximum width of a tire supported by the wheel assembly 10 extends a selected axial distance, represented by the line C-C, just beyond the outer extent of the inboard and outboard flanges 30 and 32.

The locations of the wheel assembly 10 respective inboard and outboard sections 20 and 22 are selected to define an optimum volume bounded by the wheel assembly that is the maximum effective volume for supporting a motor driver assembly capable of driving the aircraft wheel to move the aircraft on the ground. This volume has an axial dimension that is no greater, and preferably less, than the wheel tire width represented by the line C-C. As a result, the preferred motor driver assembly has a compact size not heretofore found in an aircraft in-wheel drive motor or drive means.

Instead of the bolts that would typically secure the inboard and outboard wheel sections 20 and 22 together, an annular lock ring, shown in cross-section at 42, is provided to hold these wheel components in place. A circumferential annular recess 44 in the wheel section 28 adjacent to the demountable tire flange 32 is shaped to have a configuration corresponding to that of the lock ring 42 so that the lock ring fits snugly within the recess 44. A circumferentially extending groove 46 is located adjacent to and outboard of the recess 44 to receive a retainer 48, such as a snap ring or other suitable retaining device, to retain the lock ring 42 in place until the forces produced by the inflated tire (not shown) seat the lock ring in place. Depending on the cross-sectional configuration of the lock ring 42, a retainer 48 may not be required. Additionally, one or more bolts, while not a preferred type of retainer, could also be used to secure the lock ring 42.

One type of lock ring 42 preferred for use with the split circumference wheel assembly 10 of the present invention is an annular one piece metal strip that is split transversely to its circumference so that the lock ring diameter can be enlarged, allowing the lock ring to be placed over the outboard wheel section 20 near the recess 44. Upon release, the lock ring 42 springs back to its original diameter and is seated in the recess 44. Many suitable lock ring configurations are known and can be effectively employed for this purpose. One type of lock ring cross-sectional configuration is described in U.S. Pat. No. 5,086,821 to Russell et al, the disclosure of which is hereby incorporated herein by reference.

The retainer 48, which can be a snap ring or other functionally equivalent device, if required, is placed into the circumferentially extending groove 46 to ensure that the lock ring 42 is securely retained on the wheel. The addition of other locking or retaining structures may be needed in some situations to hold the lock ring even more securely in place, thereby ensuring that the lock ring will remain on the wheel if tire pressure decreases for any reason. When the aircraft wheel tire is fully pressurized, the pressure on the tire bead flange 32 should produce a bearing pressure on the lock ring 42 and associated structures that is distributed over a sufficiently wide area to ensure the effective operation of the wheel assembly without excessive wear.

As discussed above, it is preferred that the tire bead flange 30 be formed integrally with the wheel transverse section 28, and that the tire bead flange 32 be a separate structure so that it is demountable or removable from the wheel transverse section 28. This arrangement facilitates the mounting and removal of tires from the aircraft wheel. The flange 32 is removed from the wheel, a suitable deflated tire is mounted on the wheel assembly 10, the flange 32 is replaced and moved in an inboard direction along the transverse wheel section 28 to expose the groove 44. The locking ring 42 is fitted into the annular groove 44, and the snap ring or other retainer element 48, if used, is placed into the groove 46 to hold the lock ring. When the tire is inflated, the tire bead flanges 30 and 32 are pushed apart axially in the directions indicated by arrows A and B toward the respective inboard and outboard sides of the wheel, which effectively engages the demountable flange 32 against the lock ring 42. The reverse process is followed to remove the tire after deflation.

Annular grooves 50 and 52 are preferably provided in the transverse wheel section 28 adjacent to the flange 32 to hold gaskets, seals, and the like.

As shown in FIG. 2, a motor driver assembly 60 is enclosed completely within the wheel boundaries formed by the respective inboard and outboard wheel sections 20 and 22. In the particular embodiment shown in FIG. 2, the motor driver assembly 60 is supported by support elements 62, 64, and 66 completely within the volume defined by the inboard and outboard wheel sections 22 and 20. Suitable bolts 63 and 65 or other fasteners attach these support elements together and also to adjacent sections of the wheel assembly. Bearing structures 68 and 70 provide additional support element connections.

One type of drive means or motor driver assembly 60 useful with the wheel assembly of the present invention includes a rotor element 72 positioned outwardly of a stator element 74. The rotor element 72 is rotatably supported with respect to support element 62 so that a space or gap 76 with a predetermined optimum width is maintained between the rotor element 72 and the stator element 74. While this arrangement of rotor and stator components is preferred, other rotor and stator designs that are configured to fit within the wheel well volume are also contemplated to be within the scope of the present invention.

Virtually any type of outer-rotor drive means or electric motor known in the art that is capable of generating the high torque required and is sufficiently compact to fit within the wheel space as described above could be used in the split circumference wheel assembly and motor driver assembly of the present invention. Any one of a number of designs could be used, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, or any other electric motor geometry known in the art is also contemplated to be suitable for use as a drive means in the present invention.

The drive means or electric motor selected should be able to move an aircraft landing gear wheel at a desired speed and torque. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric drive means capable of driving a gear wheel to move an aircraft on the ground, including but not limited to electric induction motors, permanent magnet brushless DC motors, and switched reluctance motors may also be used to drive an aircraft wheel with the wheel assembly of the present invention. Other motor designs capable of high torque operation across the desired speed range that can be integrated into an aircraft wheel to function as described herein may also be suitable for use in the present invention.

The preferred motor driver assembly 60 additionally includes a compact gear assembly 78 drivingly connected to the motor driver assembly 60 and located within the volume defined by the wheel assembly 10. A preferred location for the gear assembly 78 is between the stator element 74 and the extension 24 of the outboard wheel section 20, although other locations are also contemplated to be within the scope of the present invention. A range of different gearing configurations and arrangements are possible for the gear assembly 78. While a preferred gear assembly 78 is a system of planetary gears, any other type of gearing that can function for the desired purpose could also be employed. A clutch (not shown) may be provided to selectively engage and disengage the gear assembly 78 and, thus, the motor driver assembly 60 from the wheel as required. Motor driver assemblies with and without clutches are contemplated to be within the scope of the present invention.

The wheel assembly 10 and motor driver assembly 60 preferably rest on and are supported by the landing gear wheel axle 12, as shown. Other arrangements may also be employed and are contemplated to be within the scope of the present invention.

Maximum space is provided for the structures of the motor driver assembly 60 by locating the inboard and outboard wheel sections 20 and 22 toward the piston 16 and the wheel well opening 18 and as far away from the midpoint (not shown) of the wheel assembly 10 and axle 12 as possible. The outboard section 20 must be positioned to avoid coming into contact with the narrowest part of the wheel well or landing gear doors, which is represented by the vertical boundary line 18. The outboard section or support wall 20 may be located a selected distance inboard of the wheel well boundary line 18, as shown, or further outboard, if required. The location of the inboard wheel section 22 is limited by the location of the piston 16 and space requirements for structures associated with the inboard part of the wheel.

The valve stem assembly 40 allows easy access to the wheel tire and valve (not shown) to check tire pressure and inflate the tire, if necessary. The valve stem can be accessed from the outboard side of the wheel without interfering with the motor drive assembly or the locking rim assembly components. Moreover, the arrangement of the motor driver assembly 60 within the present wheel assembly 10 makes changing a tire mounted on the wheel a significantly easier process than changing a tire on existing aircraft wheels. The motor and driver assembly does not have to be removed from the aircraft and can stay in place within the wheel as shown in FIG. 2. As a result, the amount of wheel mass that must be removed from the aircraft during a tire change is reduced considerably, since the bulk of the inboard support wall 22 supports motor mass that can stay connected to the aircraft. In addition, the use of a low profile tire, such as that disclosed in International Patent Application No. WO 2008/027458, the disclosure of which is incorporated herein by reference, can also help maximize the space available inside the wheel well.

Not only are tire changes easier with the wheel assembly and motor driver assembly of the present invention, but servicing the wheel and the motor driver assembly can be performed without disconnecting electric connections between the motor, such as at connector 36, and a wire harness (not shown) that leads into the aircraft fuselage. Moreover, the wheel assembly and motor driver assembly shown in FIG. 2 are configured to permit easy access to motor components, such as the rotor 72, stator 74, and/or bearing structures 26 and 34, after simply removing the snap ring or other retainer 48, the lock ring 42, and the outboard wheel section 20. This configuration additionally facilitates sealing the motor driver assembly from contaminants, such as water, ice, and snow, and highly corrosive materials, such as, for example, hydraulic fluids and the deicing chemicals commonly used at airports.

A major advantage of the design of the split circumference wheel assembly 10 and motor driver assembly 60 is achieved by the continued use of the existing tires, axle 12, and piston 16 already in use on an aircraft. Since these structures are not altered from their original condition or otherwise changed in any way by the installation of the present wheel and motor driver assembly, the rim width, tire bead, and bead seat would not require re-certification by the FAA or other authorities, thus eliminating a potentially time consuming and costly process. As a result, the wheel assembly and motor driver assembly described herein is especially well suited for installation on existing aircraft.

Only half of the wheel assembly and motor driver assembly of the present invention is shown in FIG. 2. A mirror image of these structures is located on the opposite side of the axle 12 beyond the axle midline 14. Additionally, these assemblies have been described in connection with a single aircraft landing gear wheel. The split circumference wheel assembly and motor driver assembly described and shown herein can also be used simultaneously on more than one aircraft wheel, including one or more of the nose wheels or the other aircraft wheels, including the aircraft main wheels.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability in retrofitting existing aircraft with an effective and efficient split circumference wheel assembly secured by a locking ring with an integral motor driver assembly mounted within the space defined by the wheel assembly when it is desired to provide the advantages and benefits that can be achieved by powering aircraft gear wheels to drive an aircraft on the ground.

The invention claimed is:

1. A demountable wheel assembly with a motor driver assembly configured to fit completely within existing space in an existing aircraft landing gear wheel well, wherein said wheel assembly is supported on an axle by opposed separable inboard and outboard support walls connected to define a maximized internal volume and located within maximum inboard and outboard extents of said wheel well, wherein said separable inboard and outboard support walls are secured together by a locking ring assembly to maintain the maximized internal volume, and said motor driver assembly is integrally supported completely within said maximized internal volume.

2. An assembly as described in claim 1, wherein said opposed separable inboard and outboard support walls comprise an inboard support wall connected to an outboard support wall along said axle, said outboard support wall has an integral tire-supporting section opposite said axle, and said inboard support wall and said outboard support wall are spaced apart a distance selected to define said maximized internal volume between said axle and said tire-supporting section.

3. An assembly as described in claim 2, wherein said locking ring assembly comprises a circumferential locking ring element formed to have a cross-sectional configuration selected to optimally secure said separable inboard and outboard support walls, and said outboard support wall tire-supporting section is formed with an annular groove configured to conform to said selected cross-sectional configuration of said circumferential locking ring element.

4. An assembly as described in claim 3, wherein said locking ring assembly further comprises a retaining lock element adapted to securely retain said circumferential locking ring element within said annular groove, thereby securing said separable inboard and outboard support walls and maintaining said maximized internal volume.

5. An assembly as described in claim 2, wherein said outboard support wall tire-supporting section comprises an inboard tire flange formed integrally with said tire-supporting section, and further comprises an opposed outboard tire flange removably mounted on said outboard support wall tire support section.

6. An assembly as described in claim 1, wherein said motor driver assembly comprises drive means for driving said wheel comprising a rotor element mounted outwardly of a stator element and a gear assembly in driving connection with said drive means, said drive means and said gear assembly being configured and positioned to fit completely within said defined maximized internal volume.

7. An assembly as described in claim 3, wherein said motor driver assembly comprises drive means comprising a rotor element and a stator element, and said rotor element is mounted outwardly of said stator element, and a gear assembly supported completely within said defined maximized internal volume.

8. An assembly as described in claim 6, wherein said drive means comprises an electric motor selected from the group consisting of axial flux motors, toroidally wound motors, electric induction motors, permanent magnet brushless DC motors, and switched reluctance motors.

9. An assembly as described in claim 5, further comprising a tire valve stem access element adapted to facilitate access to a valve of a tire mounted on said wheel assembly, said valve stem access element being mounted adjacent to said removable outboard tire flange to extend within said outboard support wall tire support section to communicate with said valve of said tire.

10. An assembly as described in claim 1, wherein said aircraft landing gear wheel comprises one or more nose landing gear wheels or one or more main landing gear wheels.

11. An assembly as described in claim 1, wherein said assembly is sized and configured to fit within a defined maximum inboard extent and maximum outboard extent in a landing gear wheel in an existing aircraft without changing existing aircraft landing gear tires, axle, or piston.

12. A split circumference wheel assembly adapted to be mounted completely within an existing aircraft landing gear wheel well without altering a landing gear piston, axle, or tire, wherein separable inboard and outboard sections of said split circumference wheel assembly are removably secured between a landing gear axle and a tire mounted on said wheel assembly within inboard and outboard boundaries of said wheel well by a circumferential locking ring retained in a wheel assembly locking position by a locking element to define a maximized internal volume circumscribed by said inboard and outboard sections, wherein a motor driver assembly comprising an electric drive motor and a gear assembly is mounted completely within said maximized internal volume to drive said aircraft landing gear wheel.

13. An aircraft wheel and drive motor assembly designed to drive an aircraft on the ground independently of the aircraft's engines and external vehicles, comprising a. a split circumference separable wheel assembly mounted on an aircraft landing gear axle, comprising an inboard section with an inboard axle portion supported on said axle connected to an inboard portion extending away from said axle, and a unitary outboard section with a tire-supporting portion, an outboard axle portion supported on said inboard axle portion, and an outboard portion formed integrally with said tire-supporting portion and said outboard axle portion, wherein said inboard section and said outboard section define a maximum effective volume within said wheel assembly;

b. a pair of opposed tire supporting flanges, wherein an inboard one of said pair of flanges is formed integrally with said outboard section tire-supporting portion and an outboard one of said pair of flanges comprises a structure separate from and movably supported on a tire-contacting face of said outboard section tire-supporting portion and is formed with an annular groove on an outboard edge;

c. a drive motor assembly operably mounted completely within said maximum effective volume, said motor assembly comprising at least rotor element mounted toward said tire-supporting portion, a stator element mounted between said rotor element and said outboard axle portion, and a gear assembly; and d. a circumferential locking ring assembly comprising a locking ring element adapted to be fitted into an annular recess in said tire-contacting face of said outboard section tire-supporting portion, and a retainer element adapted to be fitted in said annular groove formed in said outboard one of said pair of tire supporting flanges in retaining contact with said locking ring element.

14. An assembly as described in claim 12, wherein said assembly is sized and configured to fit within a maximum inboard extent defined by a landing gear piston and maximum outboard extent defined by a selected outer boundary of a wheel well of a landing gear wheel in an existing aircraft without changing existing aircraft landing gear tires, axle, or piston.

15. An assembly as described in claim 12, wherein said motor assembly comprises an outer-rotor electric motor designed to produce torque required to move a commercial aircraft at an optimum speed for ground movement.

* * * * *